United States Patent
Amann

[11] Patent Number: 6,010,150
[45] Date of Patent: Jan. 4, 2000

[54] PASSIVE RESTRAINT SYSTEM FOR A MOTOR VEHICLE

[75] Inventor: Christian Amann, München, Germany

[73] Assignee: BSRS Restraint Systems GmbH, Alzenau, Germany

[21] Appl. No.: 09/290,489

[22] Filed: Apr. 12, 1999

Related U.S. Application Data

[63] Continuation of application No. PCT/EP97/05567, Oct. 9, 1997.

[30] Foreign Application Priority Data

Oct. 10, 1996 [DE] Germany ............................ 196 41 670

[51] Int. Cl.[7] .................................................... B60R 21/22
[52] U.S. Cl. ........................ 280/730.2; 280/733; 180/268
[58] Field of Search ................................. 280/730.2, 733; 180/268

[56] References Cited

U.S. PATENT DOCUMENTS

| | | | |
|---|---|---|---|
| 3,948,541 | 4/1976 | Schulman | 280/733 |
| 3,971,569 | 7/1976 | Abe et al. | 280/733 |
| 4,348,037 | 9/1982 | Law et al. | 280/733 |
| 5,556,129 | 9/1996 | Coman et al. | 280/730.2 |

FOREIGN PATENT DOCUMENTS

| | | |
|---|---|---|
| 20 37 565 | 2/1972 | Germany . |
| WO 95/19899 | 7/1995 | WIPO . |

*Primary Examiner*—Kenneth R. Rice
*Attorney, Agent, or Firm*—Akin, Gump, Strauss, Hauer & Feld, L.L.P.

[57] ABSTRACT

A passive restraint system for a motor vehicle has at least one airbag module assigned to a vehicle seat (2) to provide lateral protection of the head area of a person sitting in the vehicle and secured therein by a safety belt as an additional passive retraining component. The airbag module has at least one gas generator and a gas sack (1). In response to an actuating signal the gas generator immediately sends gas into the gas sack. In one embodiment the gas sack is designed in such a way and is so shaped that it catches the safety belt (5), optionally with a predetermined amount of slack, once the signal has been emitted, lifts it from its resting position on the person (6), and absorbs belt slack with the increase in volume. The result is that the belt (5) prevents the fully inflated gas sack (1) from swinging laterally outward, so that the head area of the person (6), which is immersed in the gas sack (1), does not substantially move out of the passenger compartment (8) profile.

6 Claims, 1 Drawing Sheet

PASSIVE RESTRAINT SYSTEM FOR A MOTOR VEHICLE

CROSS REFERENCE TO RELATED APPLICATION

This application is a continuation of International Application PCT/EP97/05567, filed Oct. 9, 1997, the disclosure of which is incorporated herein by reference.

BACKGROUND OF THE INVENTION

The invention concerns a passive restraining system for a motor vehicle, which has at least one airbag module allocated to a vehicle seat for lateral protection of the head and optionally the head-chest region of a person sitting in the vehicle seat. The airbag module has at least one gas generator and a gas sack into which the gas generator introduces gas suddenly upon a triggering signal. One proceeds from the assumption that the person is additionally secured with a customary safety belt.

Such a system is known from PCT publication WO-A-95/19899 as well as from U.S. Pat. No. 5,556,129. The first mentioned publication describes a restraining system in which the mentioned safety belt is anchored in the structure of the vehicle, thus, for example, in the B or C column. The latter publication, on the other hand, concerns the case where the safety belt is integrated into the vehicle seat.

Lateral impact protection has for some time increasingly occupied the interest of the branches of industry engaged in the manufacture of motor vehicles. There are already vehicles which serially have at their disposal so-called side airbags. Typical side airbag constellations are mentioned only as an example. Thus, for example, a system is known from European published patent application EP-A1 0 560 501 in which a separate airbag for the chest region and a further airbag for the head region are allocated to a vehicle seat. A combined head-chest airbag is already known from unpublished German patent application 195 29 829 of the present applicant. It is proposed therein in the event of an impact to inflate a gas sack which includes two chambers on the side of the seat to which the module is allocated. One of the chambers is here allocated to the head region and the other chamber to the chest region of the person sitting in the seat in question.

In the event of a lateral collision with another vehicle, the front part of the other vehicle in the accident typically first penetrates the lower door area, whereby the pelvic area of the affected vehicle occupant is thrust in the direction of the vehicle interior. Typically, the glass panes of the doors shatter and the side airbags are inflated. The head and chest region then make an evasive maneuver in the direction of the inflated head airbag or head-chest airbag. At this point there exists the danger that, due to the head striking the airbag, the head swings outward through the now glassless window opening. The head of the vehicle occupant hereby experiences a strong nodding movement owing to the lack of resistance, which can lead to injuries in the neck region, which can bring with them late sequelae such as migraine problems and others. The problems represented above occur, moreover, all the time in connection with open vehicles such as convertibles, which have no upper support structure available, or even with closed vehicles with opened side windows.

SUMMARY OF THE INVENTION

Against the above-described background, it is an object of the present invention to refine a passive restraining system of the type mentioned at the beginning, so that care is taken that the head and optionally the head-chest region of the affected vehicle occupant remain substantially within the vehicle contour in the event of a lateral impact.

This objective is accomplished by a restraining system, as described and claimed below, which may be adapted for use with safety belts which either are anchored in the structure of the vehicle or are integrated into the vehicle seat. Further advantages refinements are described below and in the dependent claims.

The first solution proposal concerns the case where the safety belt is anchored in the structure of the vehicle, thus in the B or C column, as in the already mentioned WO-A-95/19899. It is proposed that the gas sack of the airbag module be so arranged and have such a shape that it catches the safety belt to which slack is imparted immediately after the triggering signal occurs. The gas sack lifts the belt from its resting position on the person, and takes up the slack with increasing volume, so that the safety belt in its fully inflated state hinders the gas sack from a lateral, outwardly directed swinging, such that the head and optionally the head-chest region of the person, following contact with the gas sack, essentially do not leave the contours of the passenger compartment of the motor vehicle In other words, the system provides that immediately after the triggering signal for the airbag module is generated, the safety belt is imparted a slack which is established or predetermined according to vehicle type. The safety belt is thus lengthened by a (predetermined) length of 30 or 40 cm. The gas sack is now so arranged and shaped that, with increasing volume, it takes up or catches the safety belt and lifts it outwardly from its resting position on the person. At the same time, the slack of the safety belt is taken up, so that the gas sack in its fully inflated state tightens the safety belt again, despite the previously imparted slack. The safety belt for its part now impedes the gas sack from a lateral outwardly directed swinging, and to be sure, such that the head and the head-chest region remain within the contours of the vehicle, even after contact with the gas sack.

The gas sack can assume, for example, a sort of V shape for implementing the operation of catching the safety belt, the V being open slanting upwardly and having two side legs. The safety belt will then come into position through the two legs of the gas sack on the basis of the V-shaped gas sack. The V shape spoken of is, however, only a very specific embodiment. What is basic is the coordination between the volume of the gas sack and the slack to be imparted. These are the two parameters by means of which the system can be so adjusted that the safety belt itself holds the inflated gas sack within the vehicle contours.

The second solution proposal concerns the case where the safety belt is no longer anchored in the vehicle structure, but is incorporated into the vehicle seat, as provided in the already mentioned U.S. Pat. No. 5,556,129. In this case the safety belt does not need to be caught. It is namely proposed that the gas sack be so arranged and have such a shape that, in the filled state, it largely fills up the space between the safety belt, provided with a slack immediately after the triggering signal occurs, and the person, and takes up the slack so that the safety belt impedes the gas sack in its fully inflated sate from a lateral, outwardly directed swinging, in such a way that the head and optionally the head/chest region of the person essentially do not leave the contours of the passenger compartment of the motor vehicle after contact with the gas sack.

Especially preferred in the case just mentioned is the arrangement of the gas sack in the area of the outlet point of the seat belt from the seat back. Usually an aperture ring, through which the belt is passed, is arranged at the outlet point. The gas sack can be sewn onto this aperture ring, so that once the airbag module is triggered, this ring is blown away from its mounting on the seat back. Due to the profiling of the gas sack, it can be specified in advance that the aperture ring be blown away forwardly, for example. This aperture ring, however, continues to enclose the safety belt so that (as mentioned) catching the belt by the gas sack is not needed.

An important aspect of both solution proposals is imparting the slack. This is preferably predetermined, therefore controllable. It is also conceivable, however, to rely on the slack which in any case arises through the side impact owing to the intrusion of the B column into the vehicle interior. The latter indeed only occurs in connection with safety belts which are anchored on the structure of the vehicle. Nonetheless, a predetermined slack is preferred: usually the safety belt in a motor vehicle runs in a known manner from a belt winder over the B column and the D ring (at the upper guide point) over the chest of the motor vehicle passenger to the belt latch, if the belt is anchored on the structure of the vehicle. With the seat-incorporated safety belt, it exits from the seat back and runs over the chest of the motor vehicle passenger to the belt latch. Even the seat-incorporated safety belt has available a belt winder which can be arranged in the lower seat back area.

It is provided in accordance with a proposal of the invention, that the passive restraining system have an actuator which imparts the predetermined slack to the safety belt through the belt winder of the safety belt by deactivation of its blocking mechanism immediately after the triggering signal occurs, whereby the inflation of the gas sack is brought about, and thereafter the blocking mechanism of the belt winder is again activated. The actuator can be an electronic servo component. It is clear that all these actions must transpire within the shortest time, thus for example in the range from 10 to 30 msec.

In accordance with further advantageous embodiments, the invention permits the gas sack to be integrated into the structure of the vehicle, thus for example in the interior furnishing of the vehicle door, or alternatively to be incorporated into the vehicle seat. The latter is especially preferred, even if the safety belt is incorporated into the seat, since the explained function of the aperture ring with respect to guiding the safety belt is thereby guaranteed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

In all drawing figures, the same parts are provided with the same reference number.

DETAILED DESCRIPTION OF THE INVENTION

Represented in the Figures is a passive restraining system having a gas sack 1 incorporated into the vehicle seat 2, as well as a safety belt 5 anchored in the structure of the vehicle.

Figure 1:
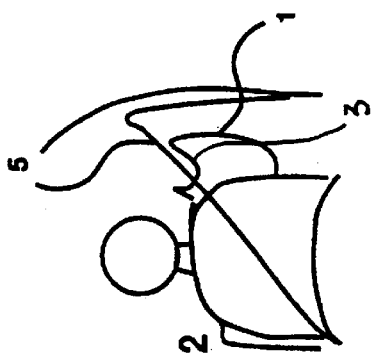

Represented in FIG. 1 is the situation in the motor vehicle interior shortly, that is about 10 msec, after the occurrence of a driver side impact. The triggering signal for the gas generator has already been generated, which thereupon began the filling of the gas sack 1. The person 6 sitting on the seat is additionally secured by the safety belt 5. The mentioned slack is not yet discernible in this situation.

Figure 2:
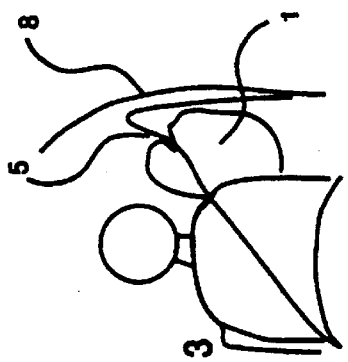
FIGS. 1 to 6 depict the temporal progression of the reaction of the restraining system within a vehicle after the occurrence of a side impact, in each case schematically represented from the front.
Figure 3:
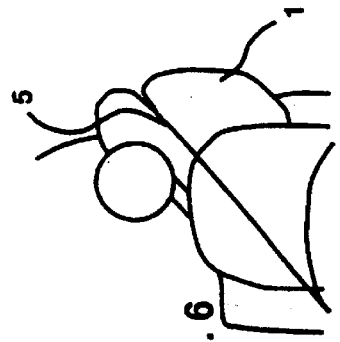
Figure 4:
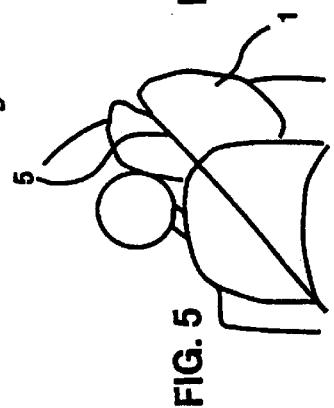
Figure 5:
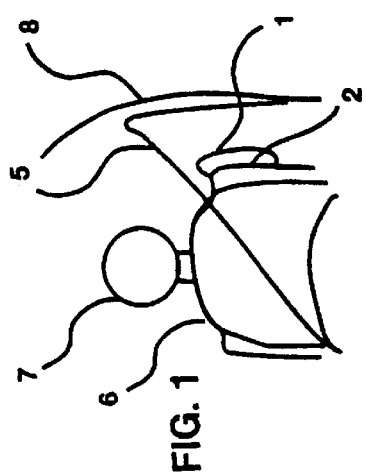

Represented in FIG. 2, on the other hand, is how the safety belt 5 is imparted a slack, in which the gas sack 1, which is just being inflated, is drawing out the belt, which at this point in time due to a mechanism is no longer blocked against rolling out for a predetermined period of time, before the blocking mechanism of the belt winder is reactivated. The volume of the gas sack 1 has increased in comparison with FIG. 1, due to further filling with gas. In the further progress over time (FIG. 3), the gas sack comes to rest on the safety belt 5 and catches it in a V shaped section 3. This leads to the safety belt 5 being lifted from its resting position on the person 6 (FIGS. 3, 4). About the time which is represented in FIG. 5, the gas sack is inflated up to its maximum volume. At this point in time, the blocking mechanism of the belt winder is reactivated, and the belt 5 is tightened again.

Figure 6:
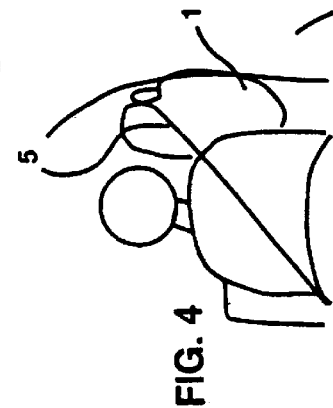
Figure 7:
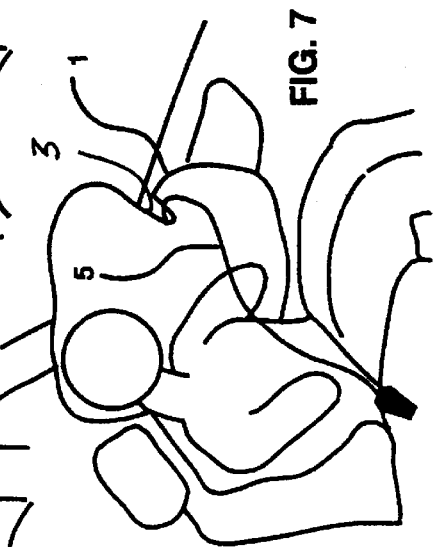
FIG. 7 is a perspective view of the situation corresponding to FIG. 6.

Due to the prevailing forces, the head 7 of the person 6 moves in a direction toward the gas sack 1, where it finally tips over or nods (FIG. 6). At this moment, the restraining system must exert its maximum protective action, that is, the slack is wholly taken up due to the volume of the gas sack between the vehicle seat 2 and the belt 5. The sure catching function of the gas sack is guaranteed (in the embodiment illustrated) by the somewhat obliquely upward-pointing V-shape (FIG. 7) of the inflated gas sack. The slack as well as the gas sack 1 must be so coordinated with each other that the latter basically does not leave the passenger compartment 8, that is, the safety belt 5 prevents the gas sack 1 from executing a swinging or tilting movement toward the outside.

Through the system of the invention it is achieved that the safety belt 5 present in any case in each motor vehicle functions as a restraining element for the gas sack 1, so that the head region of the person 6 likewise basically remains within the passenger compartment 8.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A passive restraint system for a motor vehicle, comprising at least one airbag module allocated to a vehicle seat (2) for lateral protection of the head and optionally the head-chest region of a person sitting in the vehicle seat (2), a safety belt (5) anchored in the structure of the vehicle as an additional passive restraining component, the airbag module having at least one gas generator and one gas sack (1) into which the gas generator suddenly introduces gas upon a triggering signal, wherein the gas sack (1) is so arranged and has a shape such that it catches the safety belt (5), which is imparted a slack immediately after occurrence of the triggering signal, wherein the gas sack (1) lifts the safety belt (5) from its resting position on the person (6) and takes up the slack with increasing volume, so that the safety belt (5) impedes the gas sack (1) in its fully inflated state from a lateral outwardly directed swinging, such that the head region of the person (6) after contact with the gas sack (1) essentially does not leave the contours of the passenger compartment (8).

2. The passive restraint system according to claim 1, further comprising an actuator which imparts the slack to the affected safety belt (5) through its winder by deactivating its blocking mechanism immediately after the occurrence of the triggering signal and which afterward reactivates the blocking mechanism of the belt winder.

3. The passive restraint system according to claim 1, wherein the gas sack (1) is integrated into the structure of the vehicle.

4. The passive restraint system for a motor vehicle, comprising at least one airbag module allocated to a vehicle seat (2) for lateral protection of the head and optionally the head-chest region of a person sitting in the vehicle seat (2), a safety belt incorporated into the motor vehicle seat (2) as an additional passive restraining component, the airbag module having at least one gas generator and one gas sack (1) into which the gas generator suddenly introduces gas upon a triggering signal, wherein the gas sack (1) is so arranged and has such a shape that in a filled state it largely occupies the space between the safety belt, provided with a slack immediately after occurrence of the triggering signal, and the person and takes up the slack, so that the safety belt (5) impedes the gas sack (1) in its fully inflated state from a lateral outwardly directed swinging, such that the head region of the person (60 after contact with the gas sack (1) essentially does not leave the contours of the passenger compartment (8).

5. The passive restraint system according to claim 4, further comprising an actuator which imparts the slack to the affected safety belt (5) through its winder by deactivating its blocking mechanism immediately after the occurrence of the triggering signal and which afterward reactivates the blocking mechanism of the belt winder.

6. The passive restraint system according to claim 4, wherein the gas sack (1) is integrated into the vehicle seat (2).

* * * * *